(12) United States Patent
Schmauder et al.

(10) Patent No.: US 10,220,475 B2
(45) Date of Patent: Mar. 5, 2019

(54) MACHINES FOR THE SEPARATIVE MACHINING OF PLATE-SHAPED WORKPIECES

(71) Applicant: TRUMPF Werkzeugmaschinen GmbH + Co. KG, Ditzingen (DE)

(72) Inventors: Frank Schmauder, Metzingen (DE); Simon Ockenfuss, Boeblingen (DE); Peter Epperlein, Leonberg (DE); Magnus Deiss, Stuttgart (DE); Dennis Wolf, Leonberg (DE); Johannes Krampfert, Ditzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 438 days.

(21) Appl. No.: 15/187,523

(22) Filed: Jun. 20, 2016

(65) Prior Publication Data
US 2016/0297036 A1    Oct. 13, 2016

Related U.S. Application Data

(63) Continuation of application No. PCT/EP2014/077741, filed on Dec. 15, 2014.

(30) Foreign Application Priority Data

Dec. 20, 2013    (DE) .................. 10 2013 226 818

(51) Int. Cl.
*B23K 37/02*    (2006.01)
*B23K 10/00*    (2006.01)
(Continued)

(52) U.S. Cl.
CPC .......... *B23K 37/0235* (2013.01); *B23K 10/00* (2013.01); *B23K 26/083* (2013.01);
(Continued)

(58) Field of Classification Search
CPC ........ B23K 37/02; B23K 10/00; B23K 26/08; B23K 26/38; B23K 26/16; B26F 3/00
(Continued)

(56) References Cited

U.S. PATENT DOCUMENTS 3,054,333 A    9/1962 Brainard et al.
3,422,246 A    1/1969 Wetzel
(Continued)

FOREIGN PATENT DOCUMENTS

CN    1743131 A    3/2006
CN    101332568    12/2008
(Continued)

OTHER PUBLICATIONS

Office Action in Japanese Application No. 2017-548287, dated Jul. 12, 2018, 6 pages (with English translation).
(Continued)

*Primary Examiner* — Samuel M Heinrich
(74) *Attorney, Agent, or Firm* — Fish & Richardson P.C.

(57) ABSTRACT

The invention relates to machines and methods for separative machining of a plate-shaped workpiece by a processing beam. The machines include a first movement unit configured to move the workpiece in a first direction and a second movement unit configured to move a machining head configured to emit the processing beam. The second movement unit is configured to move the machining head in a second direction perpendicular to the first direction to direct the processing beam onto the workpiece. The machines include a first workpiece support unit including a first workpiece-bearing face and a second workpiece support unit including a second workpiece-bearing face spaced apart by a gap from the first workpiece support unit and the first workpiece-bearing face. The gap extends along the second direction. The machines include at least two support slides configured
(Continued)

to move in the gap in the second direction mutually independent of one another.

27 Claims, 4 Drawing Sheets

(51) Int. Cl.
| | |
|---|---|
| *B23K 26/08* | (2014.01) |
| *B23K 26/38* | (2014.01) |
| *B23K 26/16* | (2006.01) |
| *B26F 3/00* | (2006.01) |
| *B23K 37/04* | (2006.01) |

(52) U.S. Cl.
CPC ...... *B23K 26/0869* (2013.01); *B23K 26/0876* (2013.01); *B23K 26/16* (2013.01); *B23K 26/38* (2013.01); *B23K 37/0288* (2013.01); *B23K 37/0408* (2013.01); *B26F 3/004* (2013.01); *B26F 3/008* (2013.01)

(58) Field of Classification Search
USPC .................................... 219/121.67–121.72
See application file for complete search history.

(56) References Cited

U.S. PATENT DOCUMENTS

| | | | |
|---|---|---|---|
| 4,116,097 | A | 9/1978 | Graham et al. |
| 4,752,665 | A | 6/1988 | del Santo |
| 4,916,992 | A | 4/1990 | Nasu |
| 4,993,296 | A | 2/1991 | Nasu |
| 6,727,457 | B1 | 4/2004 | Vande Berg |
| 8,256,752 | B2 | 9/2012 | Kilian et al. |
| 8,294,061 | B2 | 10/2012 | Schmauder |
| 9,757,816 | B2 | 9/2017 | Fujita et al. |
| 2003/0066574 | A1 | 4/2003 | Lovchik et al. |
| 2006/0118529 | A1 | 6/2006 | Aoki et al. |
| 2007/0221637 | A1* | 9/2007 | Schurmann ............ B23K 26/03 219/121.63 |
| 2008/0168876 | A1 | 7/2008 | Kilian et al. |
| 2010/0181165 | A1 | 7/2010 | Finn |
| 2010/0252542 | A1 | 10/2010 | Zeygerman |
| 2013/0277343 | A1 | 10/2013 | Finn |
| 2014/0090443 | A1 | 4/2014 | Schmauder et al. |
| 2014/0216223 | A1 | 8/2014 | Epperlein |

FOREIGN PATENT DOCUMENTS

| | | |
|---|---|---|
| CN | 101415648 | 4/2009 |
| CN | 201346719 | 11/2009 |
| CN | 101873909 A | 10/2010 |
| CN | 102099153 A | 6/2011 |
| CN | 202336634 U | 7/2012 |
| DE | 3509418 A1 | 9/1986 |
| DE | 3620896 A1 | 1/1987 |
| DE | 3917253 C2 | 1/1994 |
| DE | 102004059766 | 6/2006 |
| DE | 102011051170 A1 | 12/2012 |
| DE | 102011054360 A1 | 4/2013 |
| DE | 102011054361 A1 | 4/2013 |
| EP | 927597 A1 | 7/1999 |
| EP | 2 008 752 | 12/2008 |
| EP | 1901893 B1 | 3/2011 |
| EP | 2527058 A1 | 11/2012 |
| JP | 61206586 A | 9/1986 |
| JP | 63278694 A1 | 11/1988 |
| JP | 2030332 A1 | 1/1990 |
| JP | 02274494 A | 11/1990 |
| JP | 5050346 A1 | 3/1993 |
| JP | 6170469 A1 | 6/1994 |
| JP | H06170469 | 6/1994 |
| JP | 07290267 A | 11/1995 |
| JP | 10118879 A | 5/1998 |
| JP | H 10-166175 | 6/1998 |
| JP | H 10 296478 | 11/1998 |
| JP | 2000246564 A1 | 9/2000 |
| JP | 2001/170727 | 6/2001 |
| JP | 2003245838 A1 | 9/2003 |
| JP | 2004050184 A1 | 2/2004 |
| JP | 2007160811 | 6/2007 |
| JP | 2008264996 | 11/2008 |
| JP | 2012515657 | 7/2012 |
| JP | 2013119101 A1 | 6/2013 |
| WO | WO 2008/138370 | 11/2008 |
| WO | WO 2010/085486 | 7/2010 |
| WO | WO2013053569 A1 | 4/2013 |

OTHER PUBLICATIONS

Office Action in Chinese Application No. 201480069791.1, dated Sep. 21, 2017, 18 pages (with English translation).
Notification Concerning Transmittal of International Preliminary Report on Patentability and Written Opinion of the International Searching Authority for corresponding PCT Application No. PCT/EP2014/077741, dated Jun. 30, 2016, 17 pages.

\* cited by examiner

MACHINES FOR THE SEPARATIVE MACHINING OF PLATE-SHAPED WORKPIECES

CROSS-REFERENCE TO RELATED APPLICATIONS

This application is a continuation of and claims priority under 35 U.S.C. §120 to PCT Application No. PCT/EP2014/077741 filed on Dec. 15, 2014, which claims priority to German Application No. DE 10 2013 226 818.1, filed on Dec. 20, 2013. The entire contents of both of these priority applications are hereby incorporated herein by reference.

TECHNICAL FIELD

The present disclosure relates to machines that cut workpieces using processing beams such as laser beams.

BACKGROUND

JP 5050346A discloses a machine for the separative machining of plate-shaped workpieces by means of a laser beam, in the form of a combined laser and punch machine. In a machine of this type, having hybrid motion control in which the workpiece is moved in a first direction (direction X), and the machining head is moved in a second direction (direction Y) the workpiece bearing is discontinuous in the displacement range of the machining head to avoid damage by the processing beam. A gap in the direction Y thus extends in the workpiece bearing, between two workpiece-bearing faces or workpiece bearings, respectively. The processing beam that has passed through the workpiece and any slag and cutting waste that may arise are expelled through this gap. The processing beam may be a laser beam, but the use of another type of high power beam, for example in the form of a plasma arc, or of a water jet, is also possible.

Particularly in the case of such a (laser) processing machine having an additional axis for moving the machining head in the direction X, it is advantageous for the gap in the workpiece bearing to have a minimum width which corresponds to at least the displacement range of the machining head in the direction X. By means of the additional axis the machining head may be displaced with a high level of dynamics within the gap. Moreover, a wide gap allows small to medium-size cutting waste, waste grate parts, or comparatively small workpiece parts, which may be separated from one another and from the slag for example with the aid of parts chutes, to fall freely. In this way small parts may be removed from the cutting region in a significantly more rapid manner than by way of the pivoting movement of a discharge flap provided for this purpose.

However, a large gap width may also have a negative effect when cutting off comparatively small workpiece parts, since small workpiece parts are not adequately supported in the gap region and by virtue of the high gas pressure of the cutting gas which exits from the processing nozzle on the machining head and impacts the cut off workpiece parts, the small workpiece parts can potentially tilt in the gap and in some instances potentially catch on the residual workpiece. A laser and punch machine in which the workpiece is moved in the direction X and a punching die and blanking die are conjointly moved in the direction Y is known from JP2000246564 A2. For this purpose, the punching die and the blanking die by way of lever arms and universal joints are mechanically intercoupled and coupled to a common drive.

JP2030332 A1 describes a machine for thermal cutting and punching of workpieces, wherein a laser cutting-head is displaced in direction X and direction Y by means of two driven slides. The machine has a workpiece receptacle which is displaceable in direction Y synchronously to the laser cutting-head.

SUMMARY

The present disclosure relates to machines for the separative machining of plate-shaped workpieces, in particular a laser processing machine, which during the separative machining, e.g., cutting and stamping, enable improved support of workpiece parts, and in particular enable simplified discharging of cut off workpiece parts.

In certain embodiments, the machines include a first movement unit configured to move the plate-shaped workpiece in a first direction (X). The machines include a second movement unit configured to move a machining head configured to emit the processing beam. The second movement unit is configured to move the machining head in a second direction (Y) perpendicular to the first direction (X) to direct the processing beam onto the workpiece. The machines include a first workpiece support unit including a first workpiece-bearing face for supporting the workpiece. The machines include a second workpiece support unit including a second workpiece-bearing face for supporting the workpiece. The first workpiece support unit and the first workpiece bearing face are spaced apart by a gap from the second workpiece support unit and the second workpiece-bearing face. The gap extends along the second direction (Y). The machines include at least two support slides configured to move in the gap in the second direction (Y) mutually independent of one another, wherein each support slide includes a bearing face for supporting the workpiece or workpiece parts that are cut in the course of the separative machining.

In certain embodiments, the at least two support slides are displaceable within the gap, so as to be independent of the machining head.

At least two support slides of which the bearing faces in the direction X typically extend across approximately the entire width of the gap, and which in the direction Y have a significantly smaller length than the gap are disposed in the gap of the machine according to the invention. The two support slides may be displaced in a mutually independent manner; however, a coupled movement in which both support slides are displaced in a synchronous manner, i.e., at a constant relative spacing, in the gap is also possible. The region between the bearing faces of the support slides forms the actual cutting region in the gap. By way of the independent displaceability of the support slides in the direction Y, this cutting region in terms of the extent thereof is variable. Moreover, the cutting region in the direction Y may be positioned in a variable manner in the gap.

In the case of separative machining, a cutting contour is produced on the workpiece, and the two support slides are typically spaced so far apart from one another that no contamination or damage arises by way of the processing beam and of any slag which may be formed in some instances. A spacing between the two support slides in the direction Y that enables this may be approx. 5 mm or more. In order for a tilting-prone workpiece part to be cut off from the (residual) workpiece, the two support slides may be converged so as to be closer, so as to prevent tilting of the cut off workpiece part and to support the latter in a planar manner. Such a tilting-prone workpiece part may be a workpiece part which has insufficient flexural rigidity and/or which has dimensions which are too small for the workpiece part to bridge the gap after separating cutting.

A workpiece-bearing face in the context of this application is understood to be a workpiece bearing which is suitable for supporting the plate-shaped workpiece in a planar manner. Such a workpiece-bearing face need not form a continuous surface; rather, it suffices for the workpiece to be supported at a plurality of points (at least three, typically significantly more) by bearing elements (optionally only in a punctiform manner), so as to mount the workpiece in one bearing plane. The workpiece-bearing face in this case is formed by the upper sides of the bearing elements. The workpiece-bearing faces between which the gap is formed may be configured in the form of a brush table or a ball table, for example. The workpiece to be machined during machining is in this case supported by many bearing elements in the form of brushes or (rotatable) balls that are disposed on or in a table surface, respectively, and that collectively form the workpiece-bearing face. Alternatively, rotatable rollers which are disposed so as to be parallel with the gap and the rotation axis of which extends parallel with the gap may be provided as bearing elements for forming workpiece-bearing faces. Moreover, it is possible for the workpiece-bearing faces to be designed as revolving bearing belts.

Accordingly, the support slides on that side thereof that faces the workpiece may also have a continuous bearing face which may be brought to bear on the underside of the workpiece. Alternatively, the support slides may have a plurality of bearing elements, for example in the form of bearing pins, balls, brushes, or webs, which collectively form the bearing face on which the workpiece or cut off workpiece parts may bear.

In certain embodiments, the support slides are displaceable in the second direction (direction Y), so as to be independent of the machining head. Different drives which enable each of the support slides and the machining head to be displaced in a mutually independent manner to different positions in the direction Y are typically used for the independent movement of the support slides and of the machining head in the gap.

In some embodiments, the machine has an additional movement unit for moving the machining head in the first direction (direction X) within the gap. The movement range of the machining head in the direction X (additional axis) is restricted to the gap, i.e., that the width of the gap is larger than the displacement range of the machining head in the direction X, or corresponds precisely to the displacement range. By virtue of the lower masses to be accelerated, the movement of the machining head along the additional axis in the direction X is more dynamic than the movement of the workpiece in the direction X, such that in particular small contours may be implemented very much more rapidly using the axial movement of the additional axis, optionally in combination with the movement of the workpiece in the direction X.

The width of the gap may be significantly larger than a movement range of the machining head in the first direction, for example may be double the size thereof. In this case, only a comparatively small proportion of the width of the gap is utilized for the dynamic movement of the machining head along the additional axis. The gap which in relation to the movement range of the machining head is comparatively wide permits rapid removal of small to medium-sized cutting waste, residual grate parts, or comparatively small workpiece parts from the cutting region.

In some embodiments, a first support slide on an external edge of the bearing face thereof that faces a second support slide has a recess. By virtue of the recess, the support slides when cutting off a workpiece part may be completely converged and be positioned so as to be directly adjacent to one another, so as to guarantee support of the workpiece part across the entire area. When cutting off the workpiece part, the processing beam impacts through the recess.

In certain embodiments, the second support slide on an external edge of the bearing face thereof that faces the first support slide has a recess which is positioned at the same location in the first direction (direction X) as the recess on the first support slide. When the two support slides are positioned so as to be mutually adjacent, the two recesses collectively form one opening through which the processing beam may pass when cutting off the workpiece part. In this case, the movement of the machining head and of the support slides by a controller unit of the machine is controlled such that the separating cut position at which the workpiece part is severed from the (residual) workpiece conforms with the position of the opening such that the two external edges of the support slides at the moment when separating cutting is performed are mutually contiguous, the bearing faces being able to support the workpiece part to be cut off to the greatest possible extent. In particular, the recesses may be configured so as to be mutually complementary, i.e., that the opening formed by the recesses has two mirror-symmetrical halves. For example, the recesses may have a semi-circular or a rectangular geometry, collectively forming a circular or a rectangular, in particular a square opening.

In some embodiments, the bearing face of at least one support slide has a part-region of a heat-resistant and spark-impermeable material. The bearing face of a respective support slide may have two or more parts, wherein the parts of the bearing face that during the separating cutting is positioned so as to be directly contiguous to the processing beam should be composed of a heat-resistant material, for example of a metallic material, so as to avoid that the bearing face is damaged and, in particular, is burnt off.

In certain embodiments, the bearing face of the at least one support slide has a further part-region which is configured as a brush bearing. Typically, this part-region does not extend close to that external edge of the bearing face that during separating cutting is positioned so as to be directly contiguous to the processing beam. The brush bearing supports the workpiece or the workpiece part, respectively, without scratching the workpiece or workpiece part. That part-region of the support slide that is configured so as to be spark-impermeable acts as a barrier between the processing beam and the brush bearing, preventing damage to the brushes by flying sparks.

In some embodiments, a brush height of that part-region of the bearing face that is configured as a brush bearing is larger than an extent below the workpiece-bearing faces of a clamping unit (for example a clamping jaw) which is provided for clamping the workpiece upon movement of the latter in the first direction. In this case, that part-region that is configured as a brush bearing in the direction Y may be at least partially displaced as far as below the clamping unit of the workpiece, which is typically disposed beside the gap, such that the region of the gap which is utilizable for cutting machining is enlarged in the direction Y.

In certain embodiments, at least one of the support slides can be displaced to a parking position outside a displacement range of the machining head in the direction Y, typically to a position outside the gap. Large workpiece parts which in the direction X extend beyond the gap, may be cut having sufficient rigidity without requiring support by the support slides, since such workpiece parts need not be supported in the gap. When such workpiece parts are being cut, the support slides should be moved apart as far as possible such that the latter are not located in the cutting region and may not be contaminated, this being ensured by the positioning in the parking position outside the displacement range of the machining head.

In some embodiments, the bearing face of at least one support slide and/or at least one of the support slides per se are/is displaceable in the direction of gravity (direction Z). In order to avoid or to establish contact between the support slides and the workpiece in a targeted manner, the support slides or the bearing face thereof may be embodied so as to be displaceable in relation to the remainder of the support slides in the direction Z. In this manner, during the displacement of the support slides in the direction Y the support slides or the bearing faces thereof in the gap may be slightly lowered such that scratching of the lower side of the workpiece by the bearing faces or by the support slides does not arise, respectively. Prior to separating cutting, the bearing faces or the support slides, respectively, by lifting may be brought to be in direct contact with the lower side of the workpiece.

The height adjustability of the support slides may also be utilized for increasing process reliability when workpiece parts are being discharged. Downward discharging of cut off workpiece parts by controlled lowering of the bearing faces ensures that the workpiece parts, when being released from the residual workpiece, are supported by the bearing faces and do not tilt or jam in the waste grate or on the residual workpiece, respectively. Moreover, a jammed workpiece part may be released by renewed lifting of the bearing faces up to the lower side of the workpiece, or by knocking against the (residual) workpiece.

In some embodiments, the bearing face of at least one support slide and/or at least one of the support slides per se are/is downwardly pivotable. The support slides or the bearing faces thereof may be embodied so as to be pivotable such that workpiece parts which after cutting off bear on the bearing faces may slide off in a downward manner by way of a pivoting movement. The pivoting movement may be performed by way of a common axis of the support slides which extends in the direction Y, or by way of mutually spaced apart axes which extend in the direction X. Successive lowering and pivoting movements, or a combined lowering and pivoting movement, are/is also possible.

In certain embodiments, at least one of the support slides is mechanically linked to at least one stationary discharge flap which is disposed so as to be adjacent to the gap and is guided along the discharge flap so as to be displaceable such that pivoting of the at least one support slide may be carried out conjointly with the discharge flap or flaps. In this case, discharging of the workpiece parts bearing on the bearing faces may be performed by slowly lowering the discharge flap downward conjointly with the support slide, followed by a rapid tilting movement of the discharge flap conjointly with the support slide, for example. It is ensured in this manner that workpiece parts may be removed in a process-reliable manner in a downward manner from the waste grate or from the remaining workpiece, respectively.

The conjoint movement of the support slides to the discharge flap, or linking the support slides to the discharge flap, respectively, may be performed by way of a linkage, for example. As an alternative to discharging by pivoting one or both support slides, respectively, discharging may also be performed exclusively by pivoting and optionally lowering the discharge flap which is disposed so as to be adjacent to the gap. The discharge flap typically extends across the entire length of the gap or of the displacement range of the machining head in the direction Y, and the discharge flap in the direction Y may optionally have a plurality of segments which are individually pivotable.

In some embodiments, a small-parts container and/or a parts chute are/is attached to at least one of the support slides, typically in a manner so as to be adjacent to the bearing face. The small-parts container, for example in the form of a basket, serves for collecting small cutting waste or workpiece parts which are formed during separative machining and which during separating cutting and discharging need not be supported from below by the support slides. Alternatively, when small waste or workpiece parts which do not have to bear on the bearing face of the support slide are being cut, a small-parts chute may be moved under the workpiece part to be cut off just before separating cutting is performed. In this manner, sorting of small parts into scrap parts which freely fall through the gap and good parts which are discharged via the parts chute is possible. In a complementary manner, relative movement of the support slide in relation to a workpiece part which bears on the bearing face may be generated by dynamic movement of the support slide within the gap. The workpiece part is incapable of following the dynamic movement of the support slide such that the support slide, in relation to the workpiece part which in the case of this movement ideally is locationally fixed, is laterally offset. In this manner, instead of the bearing face, the parts chute, which is disposed so as to be adjacent to the former, or the small-parts container of the support slide, is positioned below the workpiece part in order for the workpiece part to be discharged, or for the workpiece part to be received, respectively.

In addition to the two support slides between which separative machining by means of the machining head takes place, further support or gap-bridging elements may be disposed in the gap toward the external side of the machining region in the direction Y. Further support slides which are displaceable in the gap enable improved support of the workpiece, even at a comparatively large distance from the machining head.

In some embodiments, at least one, typically two, of the support slides is/are connected in each case to a covering element for covering the gap. The covering elements may be attached to the external edges of two support slides, for example, which are closest to the external sides of the machining region in the direction Y. The covering elements may be conjointly moved with the support slides. In this manner, covering of the gap may be performed in regions in which no separative machining takes place. The covering element may be embodied in the shape of a shutter, so as to be telescopic, scale-shaped, be a rolled-up strip, in particular a brush strip, etc., typically extending across the entire width of the gap (in the direction X). The covering element may serve as a bearing for part-regions of the residual workpiece on which no separative machining momentarily takes place. This is particularly advantageous in the case of tongue-like and flexurally non-rigid part-regions of the residual workpiece which otherwise in certain circumstances could protrude into the gap, potentially colliding with the support slides.

Moreover, replaceable wear elements, for example in the form of rollers or the like, which extend in the direction Y may be disposed in the peripheral regions of the gap, so as to be contiguous to the workpiece-bearing faces between which the gap is formed. These wear elements serve for protecting the edges of the workpiece-bearing faces upon movement of the workpiece in the direction X. The wear elements are preferably configured as rotatably mounted rollers, so as to avoid scratching of the workpiece during movement.

In certain embodiments, the machine tool comprises a controller unit which is configured or programmed, respectively, for positioning at least one of the support slides, in particular exactly two of the support slides below a workpiece part which is to be cut off in the separative machining. The workpiece part is typically a tilting-prone workpiece part which is cut off from the residual workpiece in a cutting region which is formed between the two support slides. The completely cut off workpiece part after separating cutting at least partially bears on the bearing face or the bearing faces or one or both support slides, respectively, such that the bearing faces prevent any tilting movement of the workpiece part that is caused by the pressure of the cutting gas (or the water pressure).

The controller unit serves for displacing in a controlled manner the support slides in the gap in the direction Y. Positioning of the support slides may be performed in a manner synchronous with the movement of the machining head in the direction Y and optionally in the direction X. However, the movement of the support slides may also be performed so as to be independent of the movement of the machining head in the direction Y. In this manner, the support slides, should the latter not be required when cutting large workpiece parts, for example, may be disposed so as to be spaced apart from the machining position at which the processing beam is positioned and may be moved to a parking position outside the displacement range of the machining head, for example. When the support slides are required for supporting tilting-prone workpiece parts, the former may be disposed so as to be mutually contiguous and adjacent to the machining position.

In some embodiments, the controller unit is configured or programmed, respectively, for controlling the movement of the workpiece, of the support slides, and of the machining head such that cutting off of the workpiece part, i.e., final severing of the workpiece part from the residual workpiece, is performed at a separating cut position which is formed between two mutually opposite recesses in the bearing faces of the support slides. As has been described here above, separative machining and also cutting off is typically performed between two of the support slides which for cutting off are ideally disposed in the gap so as to be directly adjacent to one another such that the cut off workpiece may be supported by both bearing faces such that the former may not tilt into the gap.

Further aspects of the invention relates to a method for the separative machining of a workpiece in a machine as described above. The method includes positioning at least one of the support slides below a workpiece part to be cut off in the course of separative machining. As has been described above in the context of the controller unit, the support slides for supporting tilting-prone workpiece parts which typically are small or not flexurally rigid, respectively, may be disposed close to the machining position. In the case of machining non-tilting-prone, comparatively large and flexurally rigid workpiece parts, the support slides or one of the support slides may be disposed so as to be spaced farther apart from the machining position, for example in a parking position.

In some embodiments, the method additionally comprises: cutting off of the workpiece part at a separating cut position which is chosen in such a manner that the workpiece part during the separating cut process is supported by the bearing faces of the two support slides, i.e., that the former bears on both bearing faces. In particular, the separating cut position is disposed between two mutually opposite recesses on the external edges of the bearing faces of the support slides. In the last case mentioned, the support slides prior to the workpiece part being cut off, i.e., prior to the moment of the latter being completely severed from the residual workpiece, are positioned so as to be directly contiguous to one another. The movement of the workpiece, of the machining head, and of the support slides is controlled such that the processing beam at the moment of separative cutting passes through the opening formed by the recesses. In this manner, the workpiece part during separating cutting may be supported by the two support slides across the entire area.

In some embodiments, prior to cutting off a workpiece part, the two support slides in the gap are converged until the two support slides are disposed so as to be adjacent in the gap, preferably so as to be directly adjacent therein. When no recesses are provided on the external edges of the bearing faces, the two support slides are disposed so as to be adjacent to one another, i.e., at a minor spacing from one another, the latter being sufficient for machining of the workpiece by the processing beam to be performed without damaging the support slides. If a recess is formed on at least one of the support slides, the processing beam may pass through the opening delimited by the recess or by the recesses, respectively, such that the support slides during cutting off may be completely converged and be positioned so as to be directly adjacent to one another, ideally so as to be spaced from one another by approximately 0 mm.

In some embodiments, the bearing faces of the support slides and/or the support slides per se during the mutually converging movement are lowered below the bearing plane of the workpiece that is formed by the workpiece-bearing faces, so as to avoid contact with the lower side of the workpiece and scratching.

In particular embodiments, the bearing faces of the support slides and/or the support slides per se during the mutually converging movement are lifted so as to support the workpiece part during separating cutting. Thus, the movement of the support slides in the direction Y may be superimposed by a movement in the direction Z, so as to avoid any loss of time caused by lifting the bearing faces to the level of the workpiece-bearing faces.

A plurality of possibilities of a discharging method exist for a cut off workpiece part to be discharged from the machine:

In some embodiments, discharging of the cut off workpiece part is performed by enlarging a spacing between the two support slides in the second direction (direction Y). In such embodiments, the two support slides are diverged so far apart that the cut off workpiece part loses planar support by the bearing faces, ideally freely falling downward between the support slides, and being able to be removed from the machining region. Enlarging the spacing may in particular be performed by way of a symmetrical movement of the support slides, i.e., that the latter are diverged at an identical (and ideally high) rate of velocity and acceleration, respectively such that the workpiece part during enlargement of the spacing is not laterally displaced.

In some embodiments, discharging of the cut off workpiece part is performed by pivoting the bearing face of at least one support slide and/or by downwardly pivoting the at least one support slide per se. The pivoting movement may be performed by way of a rotation axis which is common to both support slides and runs in the direction Y, for example, or by way of two different rotation axes running in the direction X.

In some embodiments, the bearing faces of the support slides and/or the support slides per se are lowered prior to discharging or during discharging of the cut off workpiece part. The lowering movement of the bearing faces or of the support slides, respectively, may precede the pivoting movement or the highly dynamic diverging movement of the support slides, or may superimpose the latter, so as to reliably release the workpiece part from the residual workpiece, and/or to reduce the adhesive friction of the workpiece part on the bearing faces.

The cut off workpiece part may be both a good part as well as a remnant part which has to be disposed of. Good parts and remnant parts may be received by a parts chute, by conveyor belts, etc. below the workpiece-bearing faces or below the gap, respectively, the parts being separated from the slag which arises during machining and being mutually separated.

In particular embodiments, the support slides are displaced in a preferably synchronous movement with the cut off workpiece part bearing on the bearing faces to a discharging position within the gap. A synchronous movement is understood to mean that the spacing between the two support slides in the direction Y during movement remains constant. In this variant, the height adjustability as well as the displaceability of the support slides or of the bearing faces, respectively, is utilized for moving the cut off workpiece part to a discharging position which is independent of the separating cut position. Here, the lowering movement of the bearing faces or of the support slides, respectively, enables a cut off workpiece part to be lowered so far that the latter may be moved below the residual workpiece in the direction Y and be moved to a desired discharging position. Discharging at a freely selectable discharging position in the direction Y may be utilized for sorting workpiece parts, or for conveying a workpiece part after separating cutting to the periphery of the gap, making the former manually accessible to a machine operator.

Alternatively or additionally to discharging by way of the gap, removal of the workpiece parts in an upward manner via suction grippers or magnetic grippers may be performed. As long as the workpiece-bearing faces are configured as conveyor belts, discharging may also be performed by movement of the belt-shaped workpiece-bearing faces in the first direction (direction X). As long as at least one of the two workpiece-bearing faces has one or a plurality of discharge flaps on one side of the gap, cut off workpiece parts may also be removed from the machining region by a downward pivoting movement of the flap(s). In particular, when at least one of the support slides is mechanically coupled to a discharge flap by way of a linkage, for example, a conjoint pivoting movement of the support slide and of the discharge flap may be performed in order for cut off workpiece parts to be discharged in a process-reliable manner.

The invention also relates to a computer program product which is configured for carrying out all steps of the method described above, when the computer program runs on a data processing system. In particular, the data processing system may be a controller unit of the machine on which a machining program which is substantially composed of a sequence of control commands for coordinating the movements of the workpiece, of the machining head, and of the support slides is run.

Further advantages of the invention are derived from the description and the drawing. The aforementioned features and those to be listed hereunder likewise may be used individually or in arbitrary mutual combinations. The embodiments shown and described are not to be understood as a complete enumeration but are rather exemplary in terms of outlining the invention.

Identical reference signs are used for identical components and for components with identical functions, respectively, in the following description of the drawings.

DETAILED DESCRIPTION

Figure 1:
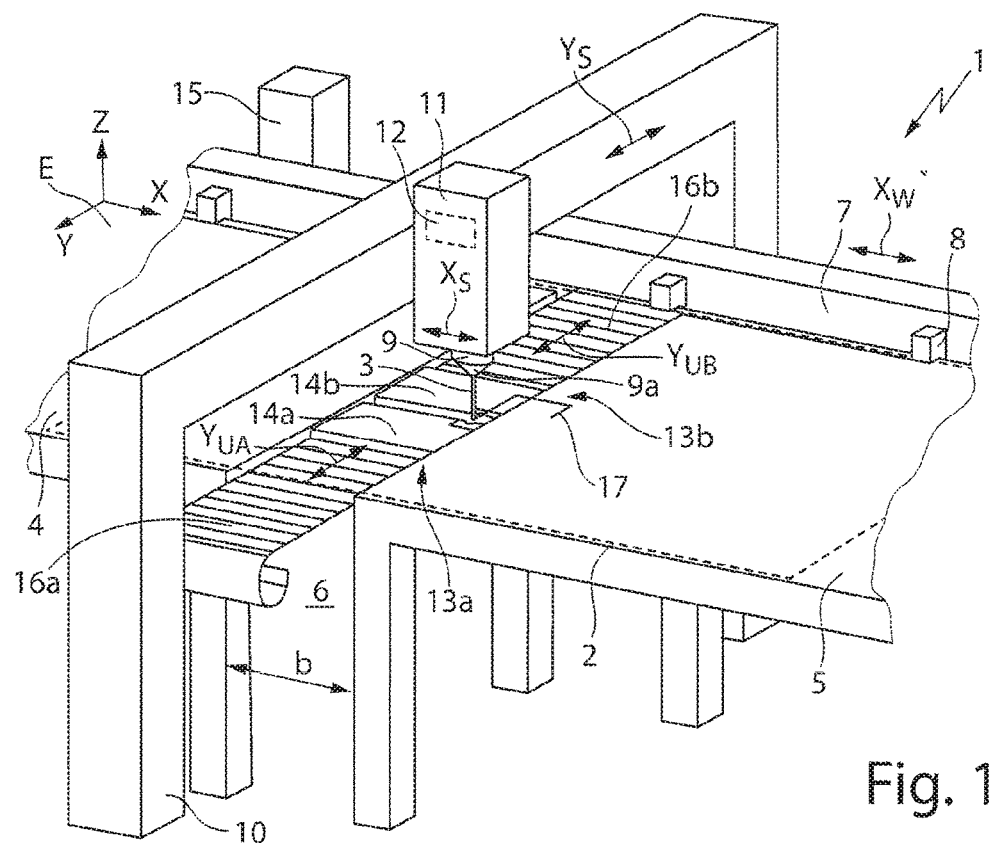
FIG. 1 shows an illustration of an exemplary embodiment of a laser processing machine having two support slides which are displaceable in a gap, when separatively machining a plate-shaped workpiece.

FIG. 1 shows an exemplary construction of a machine 1 for laser processing, more specifically for laser cutting, of a plate-shaped workpiece 2 by means of a laser beam 3, the plate-shaped workpiece 2 being illustrated by dashed lines. For machining the workpiece 2 by cutting, another type of thermal processing beam, for example a plasma torch, or a water jet, may also be employed instead of the laser beam 3. The workpiece 2 during machining bears on two workpiece-bearing faces 4, 5 forming the upper sides of two workpiece tables and defining a bearing plane E (X-Y plane of an XYZ coordinate system) for bearing the workpiece 2 thereon in the example shown. The workpiece-bearing faces 4, 5 may be formed by table surfaces or by pin-shaped bearing elements (pins), bearing belts, brushes, rollers, balls, air cushions, or similar.

By means of a conventional movement and retention unit 7 that has a drive and clamping units 8 in the form of chucking jaws for fixedly holding the workpiece 2, the workpiece 2 may be displaced in a controlled manner on the workpiece-bearing faces 4, 5 in a first movement direction X (hereunder the direction X) and moved to a predefined workpiece position W. In order for the movement of the workpiece 2 in the direction X to be facilitated, brushes, balls, or sliding rollers, which constitute the actual bearing faces 4, 5, may be attached to the workpiece tables shown in FIG. 1. Alternatively, for moving or supporting the movement of the workpiece 2 in the direction X it is possible, for example, for the workpiece-bearing faces 4, 5 per se to be designed as a movement unit, for example in the form of a (revolving) conveyor belt, such as is described in DE 10 2011 051 170 A1 of the applicant, or in the form of a workpiece bearing as is described in JP 06170469.

A gap 6 that extends in a second direction (hereunder the direction Y) across the entire displacement path of a laser cutting head 9 that directs the laser beam 3 to the workpiece 2 and focusses the laser beam on the workpiece 2, is formed between the two workpiece-bearing faces 4, 5. The laser cutting head 9 by means of a driven slide 11 that serves as a movement unit and that is guided on a stationary portal 10 is displaceable in a controlled manner in the direction Y within the gap 6. In the example shown, the laser cutting head 9 is additionally also displaceable in a controlled manner in the direction X within the gap 6 and may be displaced in a controlled manner with the aid of an additional movement unit 12, for example in the form of a linear drive, attached to the slide 11, in the direction X. In the example shown the maximum displacement path of the laser cutting head 9 in the direction X is smaller than the width b of the gap 6.

With the aid of the movement units 11, 12 that are mutually complementary, the laser cutting head 9 may be positioned both in the direction X as well as in the direction Y at a desired cutting head position XS, YS within the gap 6. Optionally, the laser cutting head 9 may also be displaced along a third movement direction Z (direction of gravity; hereunder the direction Z), so as to adjust the spacing between the processing nozzle 9a and the workpiece surface.

Two support slides 13a, 13b that extend in each case across the entire width b of the gap 6 and are displaceable in a controlled manner in the gap 6 in the direction Y and in a mutually independent manner are disposed within the gap 6. The controlled movement of the support slides 13a, 13b in the gap 6 may be performed by means of a spindle drive, for example, the spindle nut being attached to the respective support slide 13a, 13b, and the spindle and the drive motor being attached to one of the two stationary workpiece bearings 4, 5. It is self-evident that the controlled movement of the support slides 13a, 13b in the gap 6 may also be implemented in another manner.

The support slides 13a, 13b in the gap 6 may each be moved in the direction Y to a desired position $Y_{UA}, Y_{UB}$ so as to there support the workpiece 2, more specifically workpiece parts that are to be cut off from the workpiece 2 or are cut during machining, by means of a bearing face 14a, 14b, each being attached to the respective support slide 13a, 13b. The bearing face 14a, 14b of a respective support slide 13a, 13b, in the shown case is flush with the workpiece-bearing faces 4, 5 in the direction Z, i.e., that the bearing faces 14a, 14b are located in the bearing plane E for the workpiece 2.

For controlling the separative machining, the machine 1 has a controller unit 15 that serves for coordinating the movements of the workpiece 2, of the laser cutting head 9, as well as of the support slides 13a, 13b, so as to adjust a desired workpiece position Xw, a desired cutting head position $X_S, Y_S$, as well as a desired position $Y_{UA}, Y_{UB}$ of the support slides 13a, 13b, in order for cutting of a predefined cutting contour to be enabled and for the workpiece part to be supported in the region of the gap 6, if required.

The movements of the support slides 13a, 13b here may be performed in a synchronous manner, i.e., that the spacing between the position $Y_{UA}$ of the first support slide 13a and of the position $Y_{UB}$ of the second support slide 13b in the direction Y during the movement is constant. The movement of the first support slide 13a may also be performed so as to be independent of the movement of the second support slide 13b, i.e., that the spacing between the position $Y_{UA}$ of the first support slide 13a and of the position $Y_{UB}$ of the second support slide 13b in the direction Y is variable during the movement in the direction Y.

The possibility of displacing the support slides 13a, 13b in a mutually independent manner may be utilized for varying the spread in the direction Y of a cutting region that is formed between the two support slides 13a, 13b. In the case of the generation of a cutting contour 17 in the workpiece 1, as is illustrated in FIG. 1, the two support slides 13a, 13b are spaced apart from one another so far that no contamination or damage by the laser beam 3 that is positioned between the two support slides 13a, 13b arises.

Figure 2:
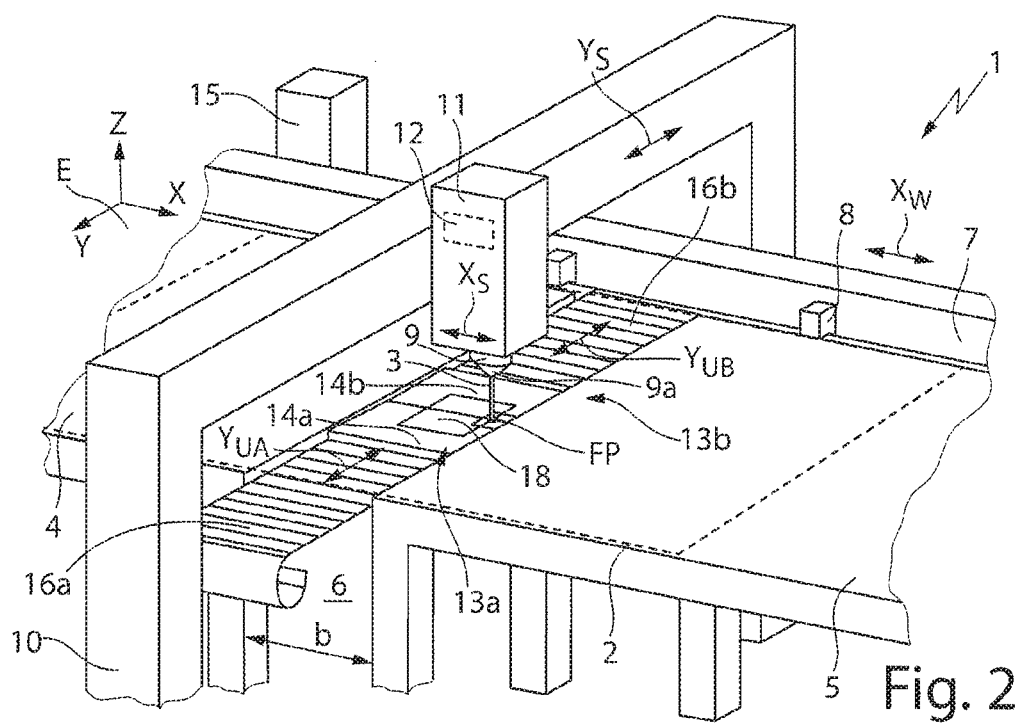
FIG. 2 shows an illustration of the machine of FIG. 1, when cutting off a workpiece part of the residual workpiece.

In order for a workpiece part 18 to be cut off from the residual workpiece 2, i.e., when severing the last connection between the workpiece part 18 and the residual workpiece 2, the two support slides 13a, 13b may be converged more closely such that only a very minor spacing or no spacing in the direction Y remains between them, as is illustrated in FIG. 2. By way of the adjacent, in particular the directly adjacent, positioning of the two support slides 13a, 13b, the workpiece part 18 during separating cutting may be supported in a planar manner, thus preventing tilting of the workpiece part 18 and in particular catching of the latter on the residual workpiece part 2. The directly adjacent positioning of the two support slides 13a, 13b is possible in that the bearing faces 14a, 14b on the mutually facing external edges 19a, 19b each have a recess 20a, 20b (cf. FIG. 3A) for the passage of the laser beam.

In the example shown in FIGS. 1 and 2, in each case one covering element 16a, 16b for covering the gap 6 outside the cutting region which is formed between the support slides 13a, 13b is attached on the support slides 13a, 13b, more specifically on the mutually averted external edges of the bearing faces 14a, 14b that run in the direction X. The covering elements 16a, 16b extend across the entire width b of the gap 6, are conjointly moved when the support slides 13a, 13b are moved in the direction Y, and in the example shown are configured in the shape of roller shutters. The covering elements 16a, 16b may also be configured in another manner, for example so as to be telescopic, scale-shaped, as a rolled-up strip, etc. The upper side of the covering elements 16a, 16b is located so as to be level with the bearing faces 14a, 14b or with the workpiece-bearing faces, 4, 5, respectively. The covering elements 16a, 16 serve as a bearing for part-regions of the residual workpiece 2 that protrude into the gap 6 and are not flexurally rigid and which, without such a bearing, under certain circumstances could collide with the support slides 13a, 13b.

Figure 3A:
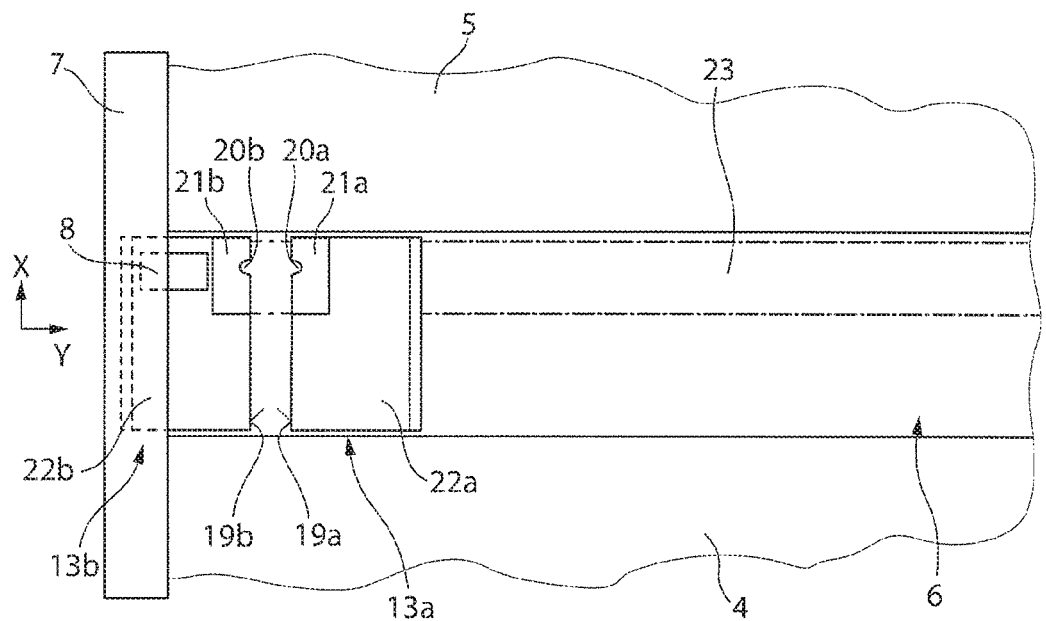
FIGS. 3A and 3B show illustrations of support slides which each have a bearing face having two dissimilarly configured part-regions.

As can be seen in FIG. 3A, the first support slide 13a on that external edge 19a thereof that faces the second support slide 13b and extends in the direction X has a semi-circular recess 20a. In an analogous manner, the second support slide 13b on that external edge 19b thereof that faces the first support slide 13a and extends in the direction X has a semi-circular recess 20b. The two recesses 20a, 20b are identically positioned in the direction X such that the recesses form a circular opening for the passage of the laser beam 3 when the two support slides 13a, 13b are fully converged (cf. FIG. 2). The two recesses 20a, 20b enable the support slides 13a, 13b during separating cutting to be disposed so as to be directly adjacent to one another, so as to enable support of the workpiece part 18 to be cut off across the entire area. The mutually complementary or mirror-symmetrical geometry, respectively, of the recesses 20a, 20b enables controlling of the two support slides 13a, 13b to be simplified.

In the example shown in FIG. 3A, the bearing faces 14a, 14b of the two support slides 13a, 13b are divided into two, i.e., that the bearing faces 14a, 14b each have a first part-region 21a, 21b of a radiation-resistant and hard material, for example a metallic material, for example of copper, and a second part-region 22a, 22b configured as a brush bearing. The two first part-regions 21a, 21b are each disposed so as to be directly contiguous to one of the mutually opposite external edges 19a, 19b of the bearing faces 14a, 14b (cf. also FIGS. 1 and 2), and each have a smooth upper side so as to enable planar support of the workpiece part 18 during separating cutting.

The extent of the first part-regions 21a, 21b in the direction X, in the case of the example shown in FIG. 3A, is not larger than the extent of the machining region 23 in the direction X. The machining region 23 comprises those cutting head positions Xs at which the laser beam 3 may be positioned by displacing the laser cutting head 9 in the direction X. As can likewise be seen in FIG. 3A, the width of the gap 6 is more than double the size of the extent of the machining region 23 in the direction X.

Figure 3B:
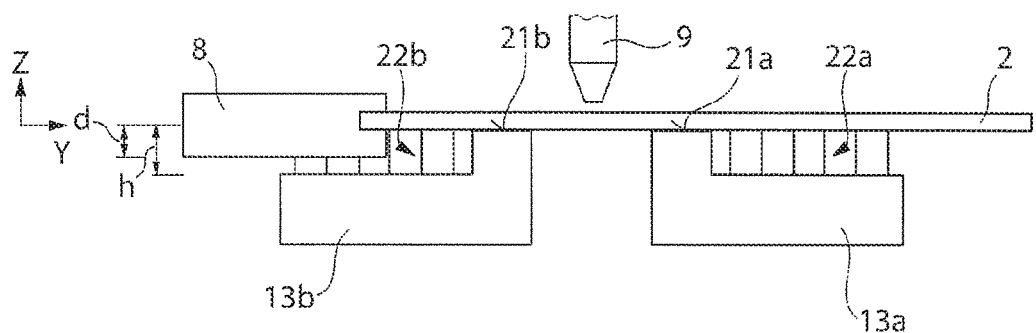

As has been described here above, the second part-regions 22a, 22b are configured as brush bearings, i.e., that the former have a plurality of brushes shown in FIG. 3B, which extend upward from a surface of the second part-region 22a, 22b that is downwardly offset by a brush height h in relation to the upper side of the first part-region 21a, 21b. Since the brushes of the second part-region 22b which is configured as a brush bearing are flexible, the second support slide 13b may be partially displaced under the clamping installation which is configured as a clamping jaw 8, as is illustrated in FIGS. 3A and 3B. The precondition therefor is that the extent d of the clamping jaw 8 below the workpiece-bearing faces 4, 5, or below the bearing plane E of the workpiece 2, respectively, is smaller than the brush height h, as is illustrated in FIG. 3A. By displacing the second support slide 13b to below the clamping jaw 8, the machining region 23 of the laser cutting head 9 in the direction Y may be extended outward such that separative machining may also be performed in the direct proximity of the clamping jaws 8, as can be seen in FIG. 3A. It is self-evident that the first movement unit 7, on that side of the workpiece bearings 4, 5 that in FIGS. 1 and 2 is on the front, optionally may have one or a plurality of clamping units, for example in the form of clamping jaws, below which the second part-region 22a of the first support slide 13a may be at least partially displaced.

Figure 4A:
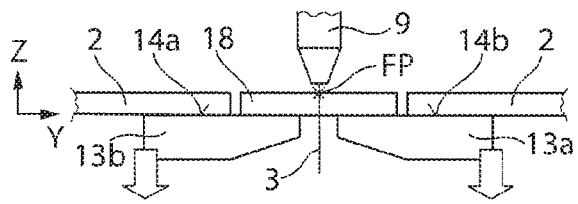
FIGS. 4A-4E show illustrations of two support slides when transporting a cut off workpiece part to a discharging position.

FIGS. 4A-4E in an exemplary manner show a motion sequence for moving the cut off workpiece part 18 of FIG. 2 in the direction Y to a discharging position AP, the latter differing from the separating cut position FP (cf. FIG. 2). As can be seen in FIG. 4A, the workpiece part 18 after cutting off bears on the two support slides 13a, 13b which (departing from what is shown in FIG. 2) during the separating cutting process are mutually disposed at a spacing A1, since the support slides 13a, 13b of FIGS. 4A-4E do not have any recesses through which the laser beam 3 may pass during the separating cutting process.

Figure 4B:
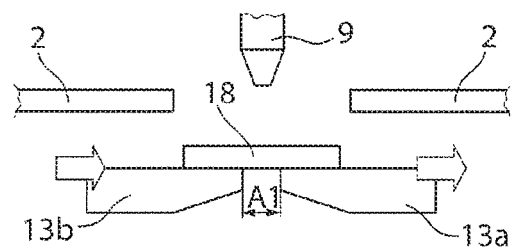
Figure 4C:
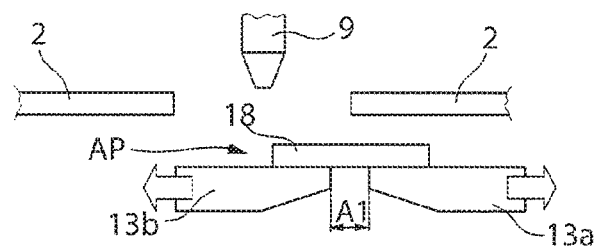
Figure 4D:
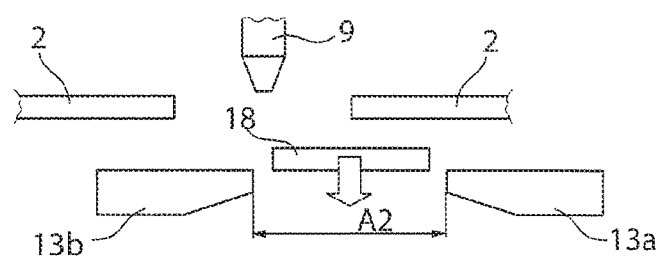

In the example shown, the support slides 13a, 13b are configured so as to be height adjustable, i.e., that the former, as is indicated by arrows in FIG. 4A, are moved from a position in which the bearing faces 14a, 14b are located so as to be level with the height of the workpiece-bearing faces 4, 5, to a lowered position that is illustrated in FIG. 4B. In the lowered position, the two support slides 13a, 13b together with the workpiece part 18 bearing there upon, may be displaced within the gap 6 under the workpiece 2 in the direction Y, as is indicated by arrows in FIG. 4B. The movement of the support slides 13a, 13b in the direction Y is performed in a synchronous manner, i.e., maintaining a constant spacing A1, until a discharging position AP for the workpiece part 18 has been reached in the direction Y, as is shown in FIG. 4C.

In order for the workpiece part 18 at the discharging position AP to be removed in a freely falling downward manner from the gap 6, the two support slides 13a, 13b are rapidly moved in a counter-acting manner in the direction Y, on account of which the spacing in the direction Y is enlarged, until a spacing A2 which is so large that the workpiece part 18 may fall down between the two support slides 13a, 13b is reached. The counter-acting movement of the two support slides 13a, 13b is typically performed in a synchronous manner, i.e., at the same rate of acceleration or velocity, respectively, such that the workpiece part 18 during the diverging movement of the two support slides 13a, 13b remains at the discharging position AP and is not laterally displaced.

Figure 4E:
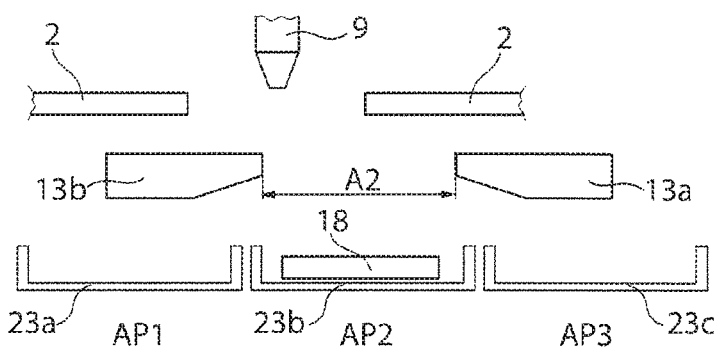

As is illustrated in FIG. 4E, the cut off workpiece part 18 at a selected discharging position AP1, AP2, or AP3, moves downward in a freely falling manner, being deposited in a parts bin 23b. It is self-evident that the discharging position AP of the workpiece part 18 in the direction Y is variable and, in particular, may be chosen independently of the separating cut position FP. Therefore, the workpiece part 18 may also be deposited in one of the other two parts bins 23a, 23c shown in FIG. 4E for example. Sorting of workpiece parts 18 may also be performed by varying the discharging position AP. Optionally, a workpiece part 18 may also be moved out beyond the gap 6 and be made accessible for manual removal by a machine operator. Other installations for receiving or discharging cut off workpiece parts 18, respectively, for example parts chutes or conveyor belts, may be positioned below the gap 6 instead of parts bins 23a-c.

Departing from the motion sequence shown in FIGS. 4A-4E, the lowering movement and diverging of the two support slides 13a, 13b may be performed in a superimposed manner, so as to enable highly dynamic discharging. Additionally or alternatively, the lowering movement of the two support slides 13a, 13b may be performed in an asynchronous manner such that the bearing faces 14a, 14b during lowering each assume a different position in the direction Z, the cut off workpiece part 18 being tilted such that the latter no longer bears on the bearing faces 14a, 14b across the entire area, on account of which static friction is reduced. The support slides 13a, 13b may also be diverged without prior lowering such that small workpiece parts, in particular scrap parts or cutting waste, respectively, may fall down through the gap 6 in a free falling manner and be discharged.

The height adjustability of the support slides 13a, 13b may also be utilized for releasing a jammed workpiece part 18 from the residual workpiece 2 in that the jammed workpiece part is lifted by the support slide or the support slides 13a, 13b respectively, to below the lower side of the workpiece 2. The support slides 13a, 13b may also be utilized for knocking from below against the workpiece 2, so as to release a jammed workpiece part 18 from the residual workpiece 2 in this manner.

In order to avoid any collision between the support slides 13a, 13b and the workpiece 2, the movement of the support slides 13a, 13b in the gap 6 may be performed in the lowered position shown in FIG. 4B. In particular, converging of the support slides 13a, 13b for supporting a workpiece part 18 at the moment of separating cutting may be performed in that the converging movement of the support slides 13a, 13 in the direction Y is superimposed by lifting the support slides 13a, 13b in the direction Z. Alternatively or additionally to the height adjustability of the support slides 13a, 13b per se, the bearing faces 14a, 14b may be configured so as to be height adjustable in relation to the remaining support slide 13a, 13b, or to a main body of the support slides 13a, 13b, respectively. In this case, the movement of the bearing faces 14a, 14b is performed in the manner which has been described above in the context of the height-adjustable support slides 13a, 13b.

The independent displaceability of the support slides 13a, 13b in the direction Y in the gap 6 enables the spacing of the position $Y_{UA}$, $Y_{UB}$ of the respective support slide 13a, 13b from the cutting head position $Y_S$ to be chosen so as to depend on the size and/or the thickness of a workpiece part to be cut off from the workpiece 2. This is favorable since comparatively large workpiece parts which during separating cutting from the (residual) workpiece 2 bear on both workpiece-bearing faces 4, 5, bridge the gap 6 and—as long as the workpiece parts have sufficient thickness and thus flexural rigidity—typically do not have to be supported with the aid of the support slides 13a, 13b.

Figure 5:
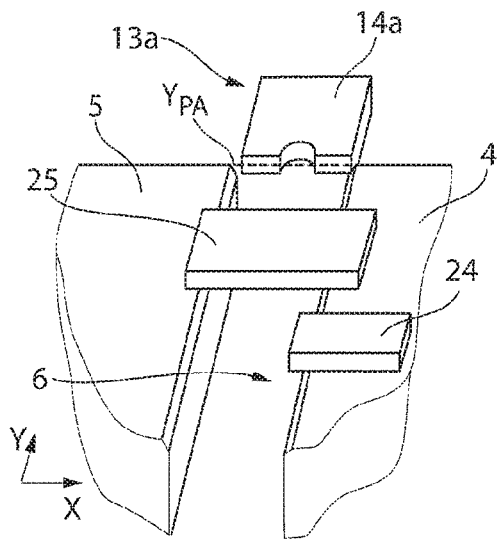
FIG. 5 shows an illustration of a support slide in a parking position outside of a machining region.

Such a workpiece part 25 that is flexurally rigid and not prone to tilting, and of which the width is larger than the width b of the gap 6, is illustrated in FIG. 5. Also in the case of a further comparatively thick and thus flexurally rigid workpiece part 24, which is illustrated in FIG. 5 and of which the dimensions are smaller than the width b of the gap 6, the center of gravity of the workpiece part 24 however at the moment of separating cutting being sufficiently far from the periphery of the gap 6, the risk of tilting into the gap 6 by virtue of the cutting gas from a processing nozzle 9a of the laser cutting head 9 impacting the workpiece part 24 is low such that the latter need not be supported.

For machining the workpiece parts 24, 25 shown in FIG. 5 it is favorable for the support slides 13a, 13b which are not required for support to be disposed at a sufficient spacing from the cutting head position $Y_S$ at which machining of the workpiece 2 is performed, so as to avoid contamination of and/or damage to the support slides 13a, 13b by the laser beam 3. In particular, in this case the first support slide 13a may be disposed at a parking position $Y_{PA}$ shown in FIG. 5, which lies outside the gap 6 and thus outside the displacement range of the cutting head 9. The second support slide 13b, as shown in FIG. 3, may also be displaced to a partially retracted position below the clamping jaw 8, which lies outside the movement range 23 of the laser cutting head 9.

Figure 6:
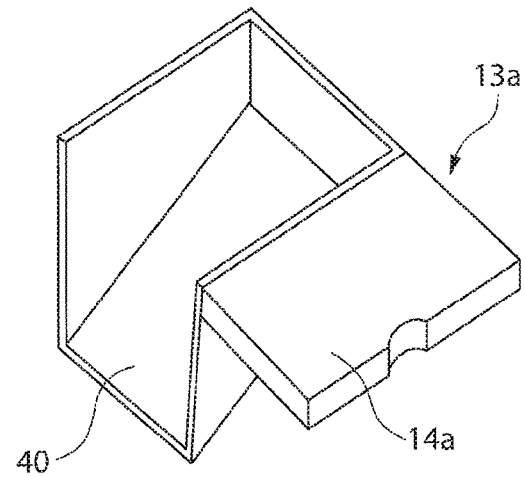
FIG. 6 shows an illustration of a support slide having a laterally attached parts chute.

As an alternative to the discharging procedure shown further above in the context of FIGS. 4A-4E, discharging of small workpiece parts 18 may also be performed by way of a parts chute 40 that is attached so as to be adjacent to the bearing face 14a on an external edge of the bearing face 14a of a support slide 13a that is opposite the recess 20a, as is illustrated in FIG. 6.

Workpiece parts 18 that are dischargeable by way of the parts chute 40 have dimensions that are smaller than the width b of the gap 6. In order for such cut off workpiece parts to be conveyed to the chute 40, the support slide 13a may be displaced in a dynamic manner, i.e., at high acceleration, in the direction Y such that relative movement between the cut off workpiece part and the support slide 13a is performed. Since the workpiece part, by virtue of the inertia thereof, cannot follow the rapid movement of the support slide 13a, the support slide 13a in relation to the workpiece part is laterally displaced such that the workpiece part ideally impacts the chute 40 in a freely falling manner. Discharging of workpiece parts may also be performed by dynamic movement of the support slide 13a, without the use of a parts chute 40. Here, the support slide 13a is displaced so rapidly that the workpiece part bearing thereon, by virtue of the inertia thereof, cannot follow the lateral movement of the support slide 13a such that the workpiece part loses the planar support thereof, ideally being discharged downward in a freely falling manner through the gap 6.

Alternatively or additionally to the possibility of lowering in the direction of gravity Z, one or both of the support slides 13a, 13b may also be mounted on the workpiece-bearing faces 4, 5 so as to be downwardly pivotable, so as to discharge cut off workpiece parts 18 from the laser processing machine 1 through the gap 6. The pivoting movement of the support slides 13a, 13b is particularly favorable when at least one discharge flap 26 which extends in the direction Y is disposed between one of the workpiece-bearing faces 4 and the gap 6 which extends in the direction Y, as is illustrated in FIG. 7, since in this case a conjoint lowering and pivoting movement of the support slides 13a, 13b and of the discharge flap 26 may be implemented.

Figure 7:
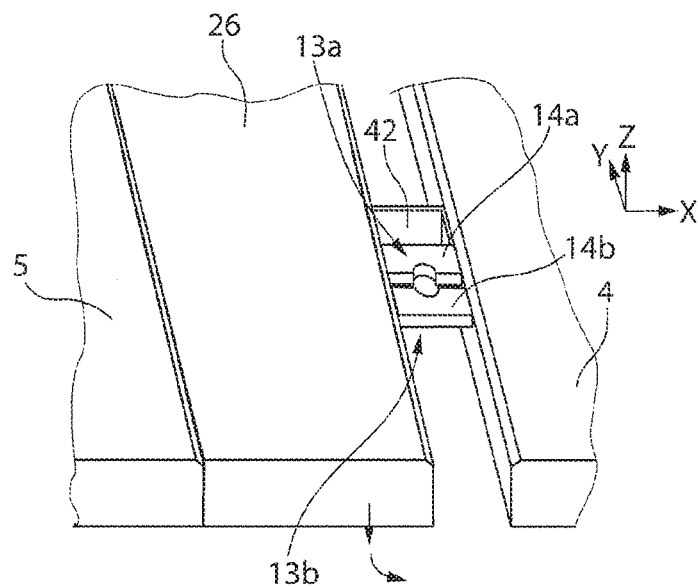
FIG. 7 shows an illustration of a support slide having a laterally attached small-parts container.

As is indicated by an arrow in FIG. 7, the discharge flap 26 in the case of such a movement may be initially lowered, so as to prevent cut off workpiece parts 18 catching on the residual workpiece 2. The comparatively slow lowering movement is followed by a more rapid tilting or pivoting movement, respectively, by means of which workpiece parts which at least partially bear on the discharge flap 26 may be removed from the machining region in a downward manner through the gap 6.

If the support slides 13a, 13b are mechanically coupled to the discharge flap 26, conjoint lowering and pivoting of the support slides 13a, 13b and of the discharge flap 26 may be performed. In general, in each case one guide as well as one drive are required for the controlled movement of the support slides 13a, 13b in the direction Y. The drive of a respective support slide 13a, 13b may be formed by a ball screw assembly, the spindle and the drive motor of which are attached to a linkage of the discharge flap. The threaded nut may be attached to the support slide 13a, 13b, and may comprise at least one guide element which is displaceably guided in a part-region of the linkage that is configured as a linear guide. The conjoint lowering movement of the support slides 13a, 13b and of the discharge flap 26 in this case may be achieved by lowering the linkage 30.

The pivoting movement may be implemented by way of rotation about a rotation axis that is substantially congruent with the position of the axis of the ball screw assembly, which in the example shown in FIG. 7 is formed on that external side of the first workpiece bearing 4 that faces the gap 6 and which runs in the direction Y. It is self-evident that the rotation may alternatively be performed about a rotation axis which runs in the direction Y and that is formed on an external side of the second workpiece bearing 5 that faces the gap 6, so as to be adjacent to the discharge flap 26.

By way of the conjoint pivoting movement, workpiece parts which bear both on the discharge flap 26 as well as on one or both of the bearing faces 14a, 14b of the support slides 13a, 13b, may be discharged in a process-reliable manner through the gap 6. It is self-evident that a pivoting and/or lowering movement of the support slides 13a, 13b may also be implemented without any mechanical linking to a discharge flap. In this case, the discharge flap 26 may be pivoted so as to be independent of the support slides 13a, 13b. As an alternative to a discharge flap which, as is shown in FIG. 7, in the direction Y extends across the entire length of the gap 6, a discharge flap which is segmented in the direction Y, and/or two or more discharge flaps may also be used. As can be seen in FIG. 7, in the case of the discharge flap 26 being present, the width b of the gap 6 is typically smaller than in the example shown in FIGS. 1 and 2, since discharging of comparatively large workpiece parts may be performed by pivoting the discharge flap 26. Optionally, the bearing faces 14a, 14b, in relation to the remaining support slide 13a, 13b, may be also pivoted about a pivot axis that extends in the direction X or in the direction Y, in order for workpiece parts to be discharged.

A further possibility for discharging small workpiece parts is represented by the lateral attachment of a small-parts container 42 on one of the support slides 13a, as is shown in an exemplary manner in FIG. 7. As opposed to the parts chute 40 shown in FIG. 6, the small-parts container 42 serves for receiving and storing small workpiece parts. The parts which are stored in the small-parts container 42 may be removed in an automated or manual manner in the parking position $Y_P$ (cf. FIG. 5) of the first support slide 13a, for example.

Apart from the possibilities described above for discharging workpiece parts, it is likewise possible for the cut off workpiece parts to be upwardly discharged, for example by using suction grippers or magnetic grippers. If the workpiece-bearing faces 4, 5, differing from those shown in FIGS. 1 and 2, are configured in the manner of a conveyor belt, cut off workpiece parts may also be discharged by moving such a conveyor belt in the direction X.

Other Embodiments

In summary, improved planar support of workpiece parts may be performed in the manner described above during separative machining, in particular during separating cutting. Simplified discharging of cut off workpiece parts may also be implemented with the aid of the support slides 13a, 13b.

What is claimed is:

1. A machine for the separative machining of a plate-shaped workpiece by a processing beam, the machine comprising:
   a first movement unit configured to move the plate-shaped workpiece in a first direction (X);
   a second movement unit comprising a machining head configured to emit the processing beam, wherein the second movement unit is configured to move the machining head in a second direction (Y) perpendicular to the first direction (X) to direct the processing beam onto the workpiece;
   a first workpiece support unit including a first workpiece bearing face for supporting the workpiece;
   a second workpiece support unit including a second workpiece bearing face for supporting the workpiece, wherein the first workpiece support unit and the first workpiece bearing face are spaced apart by a gap from the second workpiece support unit and the second workpiece bearing face, wherein the gap extends along the second direction (Y); and
   at least two support slides configured to move in the gap in the second direction (Y) mutually independently of one another, wherein each support slide includes a bearing face for supporting workpiece parts that are cut in the course of separative machining.

2. The machine of claim 1, further comprises a third movement unit for moving the machining head in the first direction (X) within the gap.

3. The machine of claim 1, wherein the at least two support slides are configured to move in the second direction (Y), so as to be independent of the machining head.

4. The machine of claim 1, wherein an external edge of the bearing face of a first support slide of the at least two support slides faces a second support slide of the at least two support slides, wherein the external edge of the first support slide includes a recess.

5. The machine of claim 4, wherein an external edge of the bearing face of the second support slide includes a recess positioned at a coordinate in the first direction (X) corresponding to a coordinate of the recess on the first support slide.

6. The machine of claim 1, wherein the bearing face of at least one support slide has a part composed at least in part of a heat-resistant and spark-impermeable material.

7. The machine of claim 6, wherein the bearing face of the at least one support slide has a further part that is configured as a brush bearing.

8. The machine of claim 7, wherein a brush height (h) of the part of the bearing face that is configured as a brush bearing is larger than an extent (d) below the workpiece-bearing faces of a clamping unit provided for clamping the workpiece upon movement of the latter in the first direction.

9. The machine of claim 1, wherein at least one of the support slides is displaceable to a parking position outside of a displacement range of the machining head in the second direction (Y).

10. The machine of claim 1, wherein one or more of the bearing faces of at least one of the support slides and at least one of the support slides are displaceable in the direction of gravity (Z).

11. The machine of claim 1, wherein one or more of the bearing faces of at least one of the support slides and at least one of the support slides are downwardly pivotable.

12. The machine of claim 1, wherein at least one of the support slides is displaceable along a discharge flap disposed adjacent to the gap and is downwardly pivotable conjointly with the discharge flap.

13. The machine of claim 1, wherein one or more of a small-parts container and a parts chute is attached to at least one of the support slides.

14. The machine of claim 1, wherein at least one of the support slides is connected to a covering element for covering the gap.

15. The machine of claim 1, further comprising a controller unit configured to control positioning of at least one of the support slides below a workpiece part that is to be cut off in the separative machining.

16. The machine of claim 15, wherein the controller unit is further configured for controlling the movement of the workpiece, of the support slides, and of the machining head such that cutting off of the workpiece part at a separating cut position is performed in such a manner that the workpiece part during the separating cut process is supported by the bearing faces of the two support slides.

17. The machine of claim 16, wherein the controller unit is configured for controlling the movement of the workpiece, of the support slides, and of the machining head such that cutting off of the workpiece part at a separating cut position is performed in such a manner that the separating cut position is located between two mutually opposed recesses in the bearing faces of the support slides.

18. A method for the separative machining of a workpiece in a machine, the method comprising:
   selecting a position of at least one support slide selected from a group of at least two support slides arranged to move in a gap between a first workpiece-bearing face of a first workpiece support unit and a second workpiece bearing face of a second workpiece support unit of the machine, wherein the position of the at least one support slide is selected to be below a workpiece part to be cut off in the course of separative machining; and machining the workpiece via a processing beam, wherein machining comprises:

moving the plate-shaped workpiece in a first direction (X); and moving a machining head configured to emit the processing beam in a second direction (Y) via moving a second movement unit, wherein the gap extends along the second direction (Y).

19. The method of claim 18, the method further comprising: cutting off of the workpiece part at a separating cut position that is chosen in such a manner that the workpiece part during the separating cut process is supported by the bearing faces of the at least two support slides.

20. The method of claim 19, wherein the separating cut position is disposed between two mutually opposite recesses on the bearing faces of the support slides.

21. The method of claim 18, wherein prior to cutting off a workpiece part, the at least two support slides in the gap are converged until the two support slides are disposed so as to be mutually adjacent in the gap.

22. The method of claim 21, further comprising lowering one or more of the bearing faces of the support slides and the support slides per se below the workpiece bearing plane during converging.

23. The method of claim 18, the method further comprising: discharging the cut off workpiece part by enlarging a spacing between the two support slides in the second direction (Y).

24. The method of claim 18, the method further comprising: discharging the cut off workpiece part by one or more of pivoting the bearing face of at least one support slide and downwardly pivoting the at least one support slide per se.

25. The method of claim 18, the method further comprising: discharging the cut off workpiece part, wherein at least one of the bearing faces of the support slides and the support slides per se are lowered prior to discharging or during discharging of the cut off workpiece part.

26. The method of claim 25, wherein the support slides in a preferably synchronous movement are displaced with the cut off workpiece part bearing on the bearing faces to a discharging position within the gap.

27. A non-transitory computer-readable storage device storing computer executable instructions for regulating separative machining of a workpiece in a machine that, if executed by a computer system, causes the computer system to:

select a position of at least one support slide selected from a group of at least two support slides arranged to move in a gap between a first workpiece-bearing face of a first workpiece support unit and a second workpiece-bearing face of a second workpiece support unit of the machine, wherein the position of the at least one support slide is selected to be below a workpiece part to be cut off in the course of separative machining; and machine the workpiece via the processing beam, wherein the machine moves the plate-shaped workpiece in a first direction (X), and moves a machining head in a second direction (Y) via moving a second movement unit, wherein the gap extends along the second direction (Y).

* * * * *